Nov. 2, 1926.
M. BEIBIN
1,605,386
AUTOMOBILE WHEEL
Filed April 2, 1926
Fig. 1.
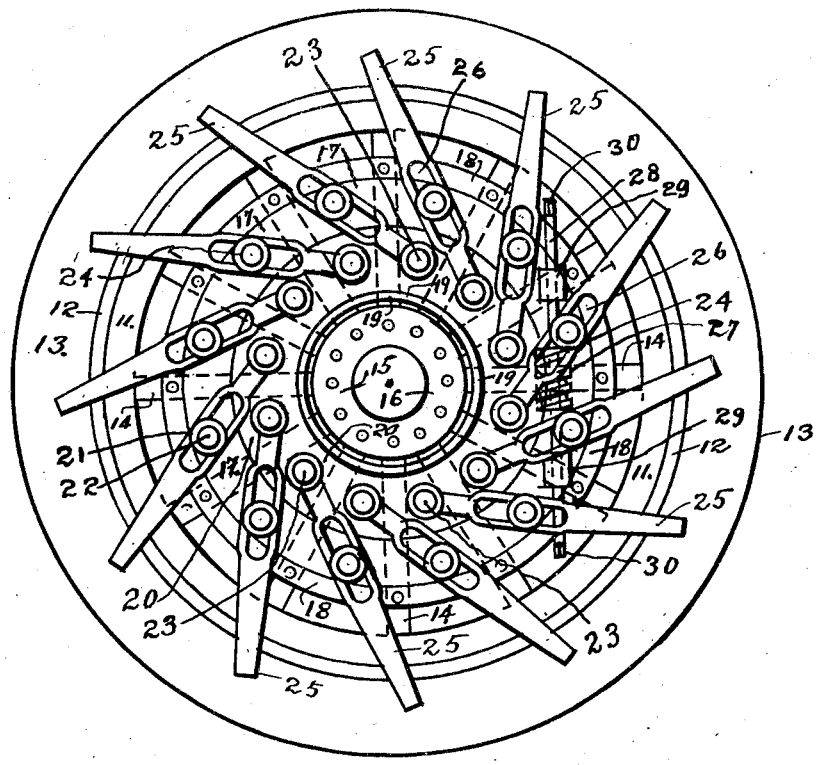
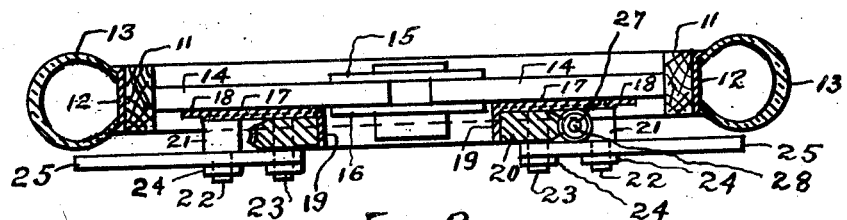
Fig. 2.
Inventor:
Morris Beibin,
By his Attorney
Israel Benjamins.

Patented Nov. 2, 1926.

1,605,386

UNITED STATES PATENT OFFICE.

MORRIS BEIBIN, OF BROOKLYN, NEW YORK.

AUTOMOBILE WHEEL.

Application filed April 2, 1926. Serial No. 99,292.

My invention relates to improvements in automobile wheels, and it consists in the novel features hereinafter more fully described.

One of the objects of my improvement is to prevent slipping of the wheels when running in snow and mud.

Another object of my improvement is to provide a perfected means for preventing slipping of the wheels, which means may readily be extended and retracting when its use is respectively required or not required, whereby the normal operation of the wheels may not be interfered with unnecessarily.

A further object of my improvement is to provide a detachable mechanism to prevent slipping of the wheels, which mechanism may be readily applied to any automobile wheel and removed therefrom, if desired.

Other objects and advantages will hereinafter appear.

I attain these objects by the mechanism illustrated in the accompanying drawings or by any mechanical equivalent or obvious modification of the same.

In the drawings Fig. 1 is a side elevation of an automobile wheel, which is supplied with my mechanism to prevent slipping of the same; Fig. 2 is a section through the axis of said wheel, showing sundry parts thereof and of said mechanism in elevation, and other parts in cross-section, also omitting sundry parts for the sake of clearness.

Similar numerals refer to similar parts throughout both views:

11 designates the felloe of an automobile wheel, which is shown as being encompassed by a demountable rim 12 and a shoe or casing 13.

Spokes 14 are shown as connecting the felloe 11 to hub-plates 15 and 16, which may be secured to said spokes 14 by means of suitable fastenings, as shown in Fig. 1.

An annular plate 17 is shown in Fig. 1 as having its flange 18 connected to the spokes 14 by means of suitable fastenings; the inner rim of said plate or member 17 is provided with a hub 19, which encompasses a circular opening in said plate 17, which opening is designed to provide access to the hub and hub-plates of the wheel.

The hub 19 serves as a pivot for a worm gear 20, which is mounted thereon in mesh with a worm 27, which is connected to a spindle 28, which is mounted in bearings 29, secured to said plate 17.

The ends of said spindle 28 are prismatic, as shown at 30 in Fig. 1, whereby a turning motion may be imparted to said spindle by means of a suitable key-wrench or handle, thereby turning said gear 20.

Said plate 17 also has thereon a number of shouldered pins 21—22, and said gear 20 also has therein pins 23; slotted arms 25 are pivotally connected at their inner ends to said gear 20 by means of said pin 23, the slots 26 in said arms 25 having the small ends 22 of said pins 21—22 passing therethrough.

Caps 24 are employed to keep said arms 25 from becoming disengaged from said pins 22 and 23, as shown in Fig. 2, where all but two of the arms 25 are omitted for the sake of clearness.

It is evident that, when the worm 27 is rotated in a way to turn the gear 20 counterclockwise in Fig. 1, the pins 23 will approach the pins 21—22, causing the arms 25 to be extended outwardly, the slots 26 permitting said arms 25 to slide on said pins 21—22 when said gear 20 is turned.

In a similar way, by turning said gear 20 clockwise, the arms 25 may be retracting so as not to interfere with the normal operation of the wheel.

When snow is encountered and the wheel slips thereon, the arms 25 may be extended until their outer ends touch the ground and the weight of the wheel rests thereon, or to any extent, which may be deemed advisable under any circumstances, thereby causing the outer ends of said arms 25 to react on the ground to propel the wheel without allowing it to slip.

When the wheels are not in danger of slipping again, the arms may be retracted again by the driver of the automobile.

In fair weather the plates 17, with my mechanism to prevent slipping of the wheels, may be removed from the wheel entirely, if desired; the arms 25 are also readily attachable and detachable when it is necessary or deemed advisable.

Either drive wheel or both drive wheels may be provided with my mechanism to prevent slipping of the same.

Variations are possible and parts of my invention may be used without other parts. I do not, therefore, restrict myself to the details as shown in the drawings; but I intend to include also all mechanical equivalents and reasonably obvious modifications of the same within the scope of my invention.

I claim as my invention, and desire to secure by Letters Patent:

In combination with an automobile wheel a member, which is stationary with relation to said wheel, secured to said wheel, a rotary member, pivotally connected to said stationary member, arms, pivotally connected to said rotary member, pins, on said stationary member, slots in said arms in slidable engagment with said pins, and a means for turning said rotary member, thereby extending or retracting said arms with relation to the periphery of said wheel.

Executed on the 31st day of March, 1926.

MORRIS BEIBIN.